United States Patent
Lai et al.

(10) Patent No.: US 10,331,257 B2
(45) Date of Patent: Jun. 25, 2019

(54) TOUCH PANEL AND METHOD FOR ARRANGING ELECTRODES THEREOF

(71) Applicant: Novatek Microelectronics Corp., Hsinchu (TW)

(72) Inventors: Chih-Chang Lai, Taichung (TW); Ching-Yang Pai, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 126 days.

(21) Appl. No.: 14/740,277

(22) Filed: Jun. 16, 2015

(65) Prior Publication Data

US 2016/0216826 A1    Jul. 28, 2016

(30) Foreign Application Priority Data

Jan. 27, 2015 (TW) ................. 104102673

(51) Int. Cl.
   *G06F 3/041*  (2006.01)
   *G06F 3/044*  (2006.01)

(52) U.S. Cl.
   CPC ............ *G06F 3/0416* (2013.01); *G06F 3/044* (2013.01); *G06F 2203/04103* (2013.01)

(58) Field of Classification Search
   CPC ................................ G06F 3/0416; G06F 3/044
   See application file for complete search history.

(56) References Cited

U.S. PATENT DOCUMENTS

2013/0181943 A1* 7/2013 Bulea ...................... G06F 3/044
                                                            345/174

2014/0184539 A1    7/2014 Shin
2014/0320446 A1   10/2014 Kim et al.
2014/0333572 A1   11/2014 Hu

FOREIGN PATENT DOCUMENTS

| CN | 103941936 | 7/2014 |
| CN | 103971355 | 8/2014 |
| CN | 104035624 | 9/2014 |
| TW | M481453 | 7/2014 |
| TW | M48741 | 8/2014 |
| TW | M488050 | 10/2014 |

OTHER PUBLICATIONS

"Office Action of Taiwan Counterpart Application," dated Aug. 8, 2016, p. 1-p. 4, in which the listed references were cited.
"Office Action of China Counterpart Application", dated Apr. 3, 2018, p. 1-p. 6, in which the listed references were cited.

\* cited by examiner

*Primary Examiner* — Amare Mengistu
*Assistant Examiner* — Shawna Stepp Jones
(74) *Attorney, Agent, or Firm* — JCIPRNET (57) ABSTRACT

A touch panel and a method for arranging electrodes of the touch panel are provided. The touch panel includes a plurality of touch sections. Each of the touch sections includes a first transmitter electrode, a first receiver electrode, a second transmitter electrode, a second receiver electrode, and a third receiver electrode. The first transmitter electrode has a first side and a second side opposite to the first side. The first receiver electrode adjoins the first side. The second transmitter electrode has a third side and a fourth side opposite to the third side. The second receiver electrode adjoins the second side and the third side. The third receiver electrode adjoins the fourth side.

16 Claims, 6 Drawing Sheets

TOUCH PANEL AND METHOD FOR ARRANGING ELECTRODES THEREOF

CROSS-REFERENCE TO RELATED APPLICATION

This application claims the priority benefit of Taiwan application serial no. 104102673, filed on Jan. 27, 2015. The entirety of the above-mentioned patent application is hereby incorporated by reference herein and made a part of this specification.

FIELD OF THE INVENTION

The invention relates to a touch panel, and more particularly, to a capacitive touch panel and a method for arranging electrodes of the capacitive touch panel.

DESCRIPTION OF RELATED ART

In general, capacitive touch control technologies can be categorized into self-capacitive touch control technologies and mutual capacitive touch control technologies. According to the mutual capacitive touch control technologies, a driver voltage is applied to a transmitter electrode, and the capacitance between the transmitter electrode and a receiver electrode can be determined according to a touch signal output by the receiver electrode. Based on variations in the capacitance between the transmitter electrode and the receiver electrode, the nature of the touch action and the position of the touch action can be ascertained. Therefore, the number of the transmitter electrode and the number of the receiver electrode may affect the resolution of a touch apparatus. Generally, the number of transmitter electrodes and the number of receiver electrodes are associated with the number of traces in the touch apparatus. If the transmitter electrode and the receiver electrode are electrically connected to one single sensor IC, the number of pins in the sensor IC needs be correspondingly increased in line with the number of traces. That is, the increase in the resolution of the touch apparatus leads to the increase in the volume of the sensor IC, which raises hardware costs of the sensor IC and impedes the convenience of arranging the sensor IC.

SUMMARY OF THE INVENTION

The invention is directed to a touch panel and a method for arranging electrodes of the touch panel. Through providing different arrangements of transmitter electrodes and receiver electrodes, the number of transmission traces of a touch apparatus can be reduced, and thus hardware costs of a driver unit can be lowered down as well.

In an embodiment of the invention, a touch panel includes a plurality of touch sections. Each of the touch sections includes a first transmitter electrode, a first receiver electrode, a second transmitter electrode, a second receiver electrode, and a third receiver electrode. The first transmitter electrode has a first side and a second side opposite to the first side. The first receiver electrode adjoins the first side. The second transmitter electrode has a third side and a fourth side opposite to the third side. The second receiver electrode adjoins the second side and the third side. The third receiver electrode adjoins the fourth side.

According to an embodiment of the invention, when the first transmitter electrode receives a first driver signal, the first receiver electrode provides a first touch signal, and the second receiver electrode provides a second touch signal. When the second transmitter electrode receives a second driver signal, the second receiver electrode provides a third touch signal, and the third receiver electrode provides a fourth touch signal.

According to an embodiment of the invention, each of the touch sections further includes a fourth receiver electrode, a fifth receiver electrode, and a sixth receiver electrode. The fourth receiver electrode adjoins the first side and the first receiver electrode. The fifth receiver electrode adjoins the second side, the third side, and the second receiver electrode. The sixth receiver electrode adjoins the fourth side and the third receiver electrode.

According to an embodiment of the invention, when the first transmitter electrode receives the first driver signal, the fourth receiver electrode provides a fifth touch signal, and the fifth receiver electrode provides a sixth touch signal. When the second transmitter electrode receives the second driver signal, the fifth receiver electrode provides a seventh touch signal, and the sixth receiver electrode provides an eighth touch signal.

According to an embodiment of the invention, the touch panel further includes a plurality of first reserved electrodes and a plurality of second reserved electrodes. The first transmitter electrode of each of the touch sections and the first transmitter electrode of one of the touch sections adjacent to the each of the touch sections surround a corresponding one of the first reserved electrodes, and the second transmitter electrode of each of the touch sections and the second transmitter electrode of one of the touch sections adjacent to the each of the touch sections surround a corresponding one of the first reserved electrodes. The first receiver electrode and the fourth receiver electrode of each of the touch sections surround a corresponding one of the second reserved electrodes, the second receiver electrode and the fifth receiver electrode of each of the touch sections surround a corresponding one of the second reserved electrodes, and the third receiver electrode and the sixth receiver electrode of each of the touch sections surround a corresponding one of the second reserved electrodes.

According to an embodiment of the invention, the first reserved electrodes are electrically connected through a plurality of first reserved traces, and the second reserved electrodes are electrically connected through a plurality of second reserved traces. If the touch panel is built in a liquid crystal display (LCD) panel, a ground voltage is applied to the first reserved traces and the second reserved traces, and if the touch panel is neither built in nor arranged on the LCD panel, the first reserved traces and the second reserved traces are floating.

According to an embodiment of the invention, each of the touch sections further includes a seventh receiver electrode, an eighth receiver electrode, and a ninth receiver electrode. The seventh receiver electrode adjoins the first side and the fourth receiver electrode. The eighth receiver electrode adjoins the second side, the third side, and the fifth receiver electrode. The ninth receiver electrode adjoins the fourth side and the sixth receiver electrode.

According to an embodiment of the invention, when the first transmitter electrode receives the first driver signal, the seventh receiver electrode provides a ninth touch signal, and the eighth receiver electrode provides a tenth touch signal. When the second transmitter electrode receives the second driver signal, the eighth receiver electrode provides an eleventh touch signal, and the ninth receiver electrode provides a twelfth touch signal.

According to an embodiment of the invention, the first receiver electrode of each of the touch sections is in physical contact with the first receiver electrode of one of the touch sections adjacent to the each of the touch sections. The second receiver electrode of each of the touch sections is in physical contact with the second receiver electrode of one of the touch sections adjacent to the each of the touch sections. The third receiver electrode of each of the touch sections is in physical contact with the third receiver electrode of one of the touch sections adjacent to the each of the touch sections. The seventh receiver electrode of each of the touch sections is in physical contact with the seventh receiver electrode of one of the touch sections adjacent to the each of the touch sections. The eighth receiver electrode of each of the touch sections is in physical contact with the eighth receiver electrode of one of the touch sections adjacent to the each of the touch sections. The ninth receiver electrode of each of the touch sections is in physical contact with the ninth receiver electrode of one of the touch sections adjacent to the each of the touch sections.

According to an embodiment of the invention, the touch panel further includes a plurality of third reserved electrodes and a plurality of fourth reserved electrodes. The first transmitter electrode of each of the touch sections and the first transmitter electrode of one of the touch sections adjacent to the each of the touch sections surround a corresponding one of the third reserved electrodes. The second transmitter electrode of each of the touch sections and the second transmitter electrode of one of the touch sections adjacent to the each of the touch sections surround a corresponding one of the third reserved electrodes. The first receiver electrodes in physical contact with each other and the adjacent fourth receiver electrode surround a corresponding one of the fourth reserved electrodes. The second receiver electrodes in physical contact with each other and the adjacent fifth receiver electrode surround a corresponding one of the fourth reserved electrodes. The third receiver electrodes in physical contact with each other and the adjacent sixth receiver electrode surround a corresponding one of the fourth reserved electrodes. The seventh receiver electrodes in physical contact with each other and the adjacent fourth receiver electrode surround a corresponding one of the fourth reserved electrodes. The eighth receiver electrodes in physical contact with each other and the adjacent fifth receiver electrode surround a corresponding one of the fourth reserved electrodes. The ninth receiver electrodes in physical contact with each other and the adjacent sixth receiver electrode surround a corresponding one of the fourth reserved electrodes.

According to an embodiment of the invention, the third reserved electrodes are electrically connected through a plurality of third reserved traces. The fourth reserved electrodes are electrically connected through a plurality of fourth reserved traces. If the touch panel is built in an LCD panel, a ground voltage is applied to the third reserved traces and the fourth reserved traces. If the touch panel is neither built in nor arranged on the LCD panel, the third reserved traces and the fourth reserved traces are floating.

According to an embodiment of the invention, the fourth receiver electrode constitutes a first groove to accommodate a first connection trace of the adjacent first receiver electrode or the adjacent seventh receiver electrode. The fifth receiver electrode constitutes a second groove to accommodate a second connection trace of the adjacent second receiver electrode or the adjacent eighth receiver electrode. The sixth receiver electrode constitutes a third groove to accommodate a third connection trace of the adjacent third receiver electrode or the adjacent ninth receiver electrode.

According to an embodiment of the invention, the touch panel further includes a plurality of fifth reserved electrodes and a plurality of sixth reserved electrodes. The first transmitter electrode of each of the touch sections and the first transmitter electrode of one of the touch sections adjacent to the each of the touch sections surround a corresponding one of the fifth reserved electrodes. The second transmitter electrode of each of the touch sections and the second transmitter electrode of one of the touch sections adjacent to the each of the touch sections surround a corresponding one of the fifth reserved electrodes. The first receiver electrode and the fourth receiver electrode of each of the touch sections and the first receiver electrode and the fourth receiver electrode of one of the touch sections adjacent to the each of the touch sections surround a corresponding one of the sixth reserved electrodes. The second receiver electrode and the fifth receiver electrode of each of the touch sections and the second receiver electrode and the fifth receiver electrode of one of the touch sections adjacent to the each of the touch sections surround a corresponding one of the sixth reserved electrodes. The third receiver electrode and the sixth receiver electrode of each of the touch sections and the third receiver electrode and the sixth receiver electrode of one of the touch sections adjacent to the each of the touch sections surround a corresponding one of the sixth reserved electrodes. The fourth receiver electrode and the seventh receiver electrode of each of the touch sections and the fourth receiver electrode and the seventh receiver electrode of one of the touch sections adjacent to the each of the touch sections surround a corresponding one of the sixth reserved electrodes. The fifth receiver electrode and the eighth receiver electrode of each of the touch sections and the fifth receiver electrode and the eighth receiver electrode of one of the touch sections adjacent to the each of the touch sections surround a corresponding one of the sixth reserved electrodes. The sixth receiver electrode and the ninth receiver electrode of each of the touch sections and the sixth receiver electrode and the ninth receiver electrode of one of the touch sections adjacent to the each of the touch sections surround a corresponding one of the sixth reserved electrodes.

According to an embodiment of the invention, the fifth reserved electrodes are electrically connected through a plurality of fifth reserved traces. The sixth reserved electrodes are electrically connected through a plurality of sixth reserved traces. If the touch panel is built in an LCD panel, a ground voltage is applied to the fifth reserved traces and the sixth reserved traces. If the touch panel is neither built in nor arranged on the LCD panel, the fifth reserved traces and the sixth reserved traces are floating.

According to an embodiment of the invention, the fourth receiver electrode constitutes a fourth groove and a fifth groove to respectively accommodate a fourth connection trace of the adjacent first receiver electrode and a fifth connection trace of the adjacent seventh receiver electrode. The fifth receiver electrode constitutes a sixth groove and a seventh groove to respectively accommodate a sixth connection trace of the adjacent second receiver electrode and a seventh connection trace of the adjacent sixth receiver electrode. The sixth receiver electrode constitutes an eighth groove and a ninth groove to respectively accommodate an eighth connection trace of the adjacent third receiver electrode and a ninth connection trace of the adjacent ninth receiver electrode.

According to an embodiment of the invention, the first receiver electrodes of the touch sections are in physical contact. The second receiver electrodes of the touch sections are in physical contact. The third receiver electrodes of the touch sections are in physical contact.

In an embodiment of the invention, a method for arranging electrodes of a touch panel is provided, and the touch panel has a plurality of touch sections. Each of the touch sections includes a first transmitter electrode, a second transmitter electrode, a first receiver electrode, a second receiver electrode, and a third receiver electrode. The method includes following steps. The first receiver electrode is arranged to adjoin a first side of the first transmitter electrode. The second receiver electrode is arranged to adjoin a second side of the first transmitter electrode and a third side of the second transmitter electrode, and the second side is opposite to the first side. The third receiver electrode is arranged to adjoin a fourth side of the second transmitter electrode, and the fourth side is opposite to the third side.

In view of the above, the arrangement of the transmitter electrodes and the receiver electrodes may vary according to an embodiment of the invention. Through providing different arrangements of transmitter electrodes and receiver electrodes, the number of transmission traces required by the touch apparatus can be reduced, i.e., the number of the transmission traces corresponding to the driver unit can be reduced as well, so as to lower down the hardware costs.

Several exemplary embodiments accompanied with figures are described in detail below to further describe the invention in details.

DETAILED DESCRIPTION OF DISCLOSED EMBODIMENTS

Figure 1:
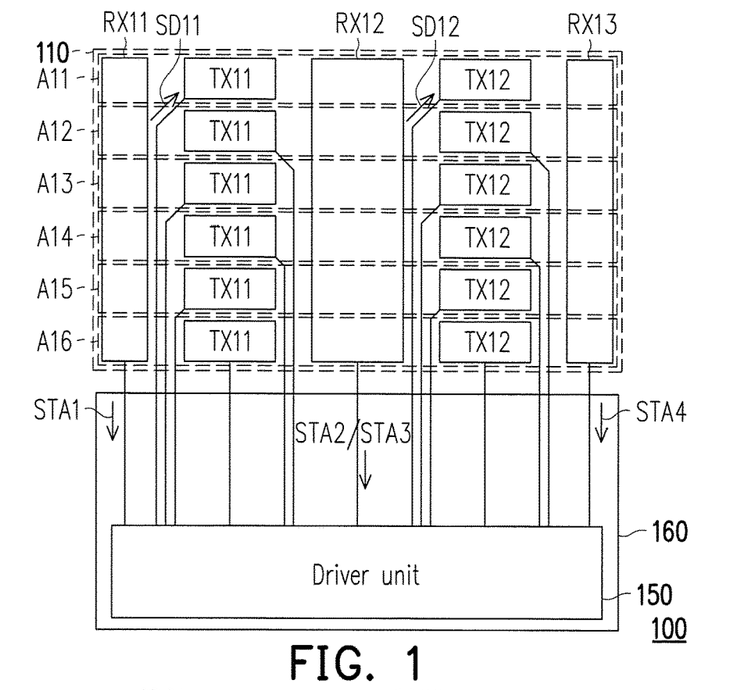
FIG. 1 schematically illustrates circuitry of a touch apparatus according to a first embodiment of the invention.

FIG. 1 schematically illustrates circuitry of a touch apparatus according to a first embodiment of the invention. With reference to FIG. 1, in the present embodiment, the touch apparatus 100 includes a touch panel 110 and a driver unit 150. Here, traces between the touch panel 110 and the driver unit 150 can be arranged on a flexible substrate 160, i.e., the touch panel 110 and the driver unit 150 can be electrically connected to each other through a flexible printed circuit board. In the present embodiment, the touch panel 100 includes a plurality of touch sections A11 to A16, for instance, and the touch resolution of the touch panel 100 is 4×6, for instance. The circuit structure of the touch sections A11 to A16 and the way to operate the touch sections A11 to A16 are substantially the same. Note that the number of the touch sections A11 to A16 and the predetermined touch resolution set forth in the present embodiment are exemplary and should not be construed as limitations to the invention provided in other embodiments.

Specifically, the touch section A11 includes a first transmitter electrode TX11, a first receiver electrode RX11, a second transmitter electrode TX12, a second receiver electrode RX12, and a third receiver electrode RX13. The first transmitter electrode TX11 has a first side (e.g., the left side) and a second side (e.g., the right side) opposite to the first side. The first receiver electrode RX11 adjoins the first side. The second transmitter electrode TX12 has a third side (e.g., the left side) and a fourth side (e.g., the right side) opposite to the first side. The second receiver electrode RX12 adjoins the second side of the first transmitter electrode TX11 and the third side of the second transmitter electrode TX12. The third receiver electrode RX13 adjoins the fourth side of the second transmitter electrode TX12. The touch sections A12 to A16 are similar to the touch section A11 and thus will not be further explained hereinafter.

As shown in FIG. 1, in the touch section A11 provided in the present embodiment, the first receiver electrode RX11 closely adjoins the left side of the first transmitter electrode TX11, the second receiver electrode RX12 closely adjoins the right side of the first receiver electrode RX11 and the left side of the second transmitter electrode TX12, and the third receiver electrode RX13 closely adjoins the right side of the second transmitter electrode TX12. The arrangement of electrodes of the touch sections A12 to A16 is similar to that of the touch section A11 and thus will not be further explained hereinafter. Here, the first receiver electrodes RX11 of the touch sections A11 to A16 are in physical contact (equivalent to electrical connection); that is, the first receiver electrodes RX11 of the touch sections A11 to A16 may be collectively deemed as the same electrode. The second receiver electrodes RX12 of the touch sections A11 to A16 are in physical contact (equivalent to electrical connection); that is, the second receiver electrodes RX12 of the touch sections A11 to A16 may be collectively deemed as the same electrode. The third receiver electrodes RX13 of the touch sections A11 to A16 are in physical contact (equivalent to electrical connection); that is, the third receiver electrodes RX13 of the touch sections A11 to A16 may be collectively deemed as the same electrode.

In the touch section A11, if the first transmitter electrode TX11 receives a first driver signal SD11 from the driver unit 150, the first receiver electrode RX11 is coupled to the first driver signal SD11 and provides a first touch signal STA1, and the second receiver electrode RX12 is coupled to the first driver signal SD11 and provides a second touch signal STA2. The first touch signal STA1 and the second touch signal STA2 can be provided simultaneously or sequentially. That is, the first driver signal SD11 coupled to the first receiver electrode RX11 may be the same as or different from the first driver signal SD11 coupled to the second receiver electrode RX12.

If the second transmitter electrode TX12 receives a second driver signal SD12, the second receiver electrode RX12 is coupled to the second driver signal SD12 and provides a third touch signal STA3, and the third receiver electrode RX13 is coupled to the second driver signal SD12 and provides a fourth touch signal STA4. The third touch signal STA3 and the fourth touch signal STA4 can be provided simultaneously or sequentially. That is, the second driver signal SD12 coupled to the second receiver electrode RX12 may be the same as or different from the second driver signal SD12 coupled to the third receiver electrode RX13.

In light of the above, when the touch apparatus 100 senses a touch action of a user, the driver unit 150 is able to determine the position of the touch action according to the time at which the driver signal (e.g., SD11 or SD12) is provided and the received touch signal (e.g., STA1, STA2, STA3, or STA4).

According to the arrangement of the electrodes provided in the present embodiment, the first transmitter electrode TX11 corresponds to the first receiver electrode RX11 and the second receiver electrode RX12, and the second transmitter electrode TX12 corresponds to the second receiver electrode RX12 and the third receiver electrode RX13. In other words, the first receiver electrode RX11 and the second receiver electrode RX12 share the first transmitter electrode TX11, the second receiver electrode RX12 and the third receiver electrode RX13 share the second transmitter electrode TX12, and the first transmitter electrode TX11 and the second transmitter electrode TX12 share the second receiver electrode RX12. Thereby, the number of the arranged electrodes of the touch panel 110 provided herein is correspondingly reduced; as such, the number of traces can be reduced as well, and the hardware costs of the touch apparatus 100 can be accordingly lowered down.

Particularly, according to said arrangement of electrodes, the number of traces among the transmitter electrodes (e.g., TX11-TX12), the receiver electrodes (e.g., RX11-RX13), and the driver unit 150 is reduced, so as to lower down the hardware costs of the touch apparatus 100. For instance, in the present embodiment, the number of the touch sections is 6, and the number of traces between the touch panel 110 and the driver unit 150 is 15. Given that the driver unit 150 is a sensor IC, the number of pins required by the sensor IC can thus be reduced, the required volume can be decreased, and the manufacturing costs of the sensor IC can be lowered down.

Figure 2:
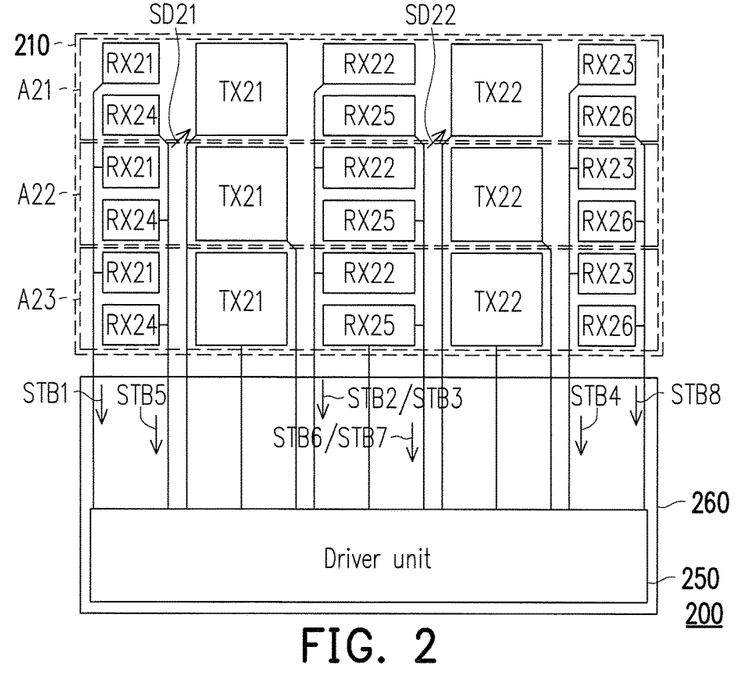
FIG. 2 schematically illustrates circuitry of a touch apparatus according to a second embodiment of the invention.

FIG. 2 schematically illustrates circuitry of a touch apparatus according to a second embodiment of the invention. With reference to FIG. 2, in the present embodiment, the touch apparatus 200 includes a touch panel 210 and a driver unit 250. Here, traces between the touch panel 210 and the driver unit 250 can be arranged on a flexible substrate 260, and the touch resolution of the touch panel 210 is also exemplified as 4×6.

The touch panel 210 includes a plurality of touch sections A21 to A23, for instance, and the circuit structure of the touch sections A21 to A23 and the way to operate the touch sections A21 to A23 are substantially the same. For instance, the touch section A21 includes a first transmitter electrode TX21, a first receiver electrode RX21, a second transmitter electrode TX22, a second receiver electrode RX22, a third receiver electrode RX23, a fourth receiver electrode RX24, a fifth receiver electrode RX25, and a sixth receiver electrode RX26.

In the present embodiment, the first receiver electrode RX21 adjoins a first side (e.g., the left side) of the first transmitter electrode TX21. The second receiver electrode RX22 adjoins the second side (e.g., the right side) of the first transmitter electrode TX21 and the third side (e.g., the left side) of the second transmitter electrode TX22. The third receiver electrode RX23 adjoins the fourth side (e.g., the right side) of the second transmitter electrode TX22. The fourth receiver electrode RX24 adjoins the first side of the first transmitter electrode TX21 and the first receiver electrode RX21. The fifth receiver electrode RX25 adjoins the second side of the first transmitter electrode TX21, the third side of the second transmitter electrode TX22, and the second receiver electrode RX22. The sixth receiver electrode RX26 adjoins the fourth side of the second transmitter electrode TX22 and the third receiver electrode RX23. The touch sections A22 and A23 are similar to the touch section A21 and thus will not be further explained hereinafter.

As shown in FIG. 2, in the touch section A21 provided herein, the first receiver electrode RX21 closely adjoins the left side of the first transmitter electrode TX21 and the top side of the fourth receiver electrode RX24, the second receiver electrode RX22 closely adjoins the right side of the first transmitter electrode TX21, the left side of the second transmitter electrode TX22, and the top side of the fifth receiver electrode RX25, the third receiver electrode RX23 closely adjoins the right side of the second transmitter electrode TX22 and the top side of the sixth receiver electrode RX26, the fourth receiver electrode RX24 closely adjoins the bottom side of the first receiver electrode RX21 and the left side of the first transmitter electrode TX21, the fifth receiver electrode RX25 closely adjoins the bottom side of the second receiver electrode RX22, the right side of the first transmitter electrode TX21, and the left side of the second transmitter electrode TX22, and the sixth receiver electrode RX26 closely adjoins the bottom side of the third receiver electrode RX23 and the right side of the second transmitter electrode TX22. The arrangement of electrodes of the touch sections A22 and A23 is similar to that of the touch section A21 and thus will not be further explained hereinafter.

In the touch section A21, if the first transmitter electrode TX21 receives a first driver signal SD21, the first receiver electrode RX21 is coupled to the first driver signal SD21 and provides a first touch signal STB1, the second receiver electrode RX22 is coupled to the first driver signal SD21 and provides a second touch signal STB2, the fourth receiver electrode RX24 is coupled to the first driver signal SD21 and provides a fifth touch signal STB5, and the fifth receiver electrode RX25 is coupled to the first driver signal SD21 and provides a sixth touch signal STB6. The first touch signal STB1, the second touch signal STB2, the fifth touch signal STB5, and the sixth touch signal STB6 can be provided simultaneously or sequentially. That is, the first driver signal SD21 coupled to the first receiver electrode RX21 and coupled to the fourth receiver electrode RX24 may be the same as or different from the first driver signal SD21 coupled to the second receiver electrode RX22 and coupled to the fifth receiver electrode RX25.

If the second transmitter electrode TX22 receives a second driver signal SD22, the second receiver electrode RX22 is coupled to the second driver signal SD22 and provides a third touch signal STB3, the third receiver electrode RX23 is coupled to the second driver signal SD22 and provides a fourth touch signal STB4, the fifth receiver electrode RX25 is coupled to the second driver signal SD22 and provides a seventh touch signal STB7, and the sixth receiver electrode RX26 is coupled to the second driver signal SD22 and provides an eighth touch signal STB8. The third touch signal STB3, the fourth touch signal STB4, the seventh touch signal STB7, and the eighth touch signal STB8 can be provided simultaneously or sequentially. That is, the second driver signal SD22 coupled to the second receiver electrode RX22 and coupled to the fifth receiver electrode RX25 may be the same as or different from the second driver signal SD22 coupled to the third receiver electrode RX23 and coupled to the sixth receiver electrode RX26.

In light of the above, when the touch apparatus 200 senses a touch action of a user, the driver unit 250 is able to determine the position of the touch action according to the time at which the driver signal (e.g., SD21 or SD22) is provided and the received touch signal (e.g., one of STB1-STB8).

According to the arrangement of electrodes provided in the present embodiment, the first transmitter electrode TX21 corresponds to the first receiver electrode RX21, the second receiver electrode RX22, the fourth receiver electrode RX24, and the fifth receiver electrode RX25; the second transmitter electrode TX22 corresponds to the second receiver electrode RX22, the third receiver electrode RX23, the fifth receiver electrode RX25, and the sixth receiver electrode RX26. That is, the first receiver electrode RX21, the second receiver electrode RX22, the fourth receiver electrode RX24, and the fifth receiver electrode RX25 share the first transmitter electrode TX21, the second receiver electrode RX22, the third receiver electrode RX23, the fifth receiver electrode RX25, and the sixth receiver electrode RX26 share the second transmitter electrode TX22, and the first transmitter electrode TX21 and the second transmitter electrode TX22 share the second receiver electrode RX22 and the fifth receiver electrode RX25. Thereby, the number of the arranged electrodes of the touch panel 210 provided herein is correspondingly reduced; as such, the number of traces can be reduced as well, and the hardware costs of the touch apparatus 200 can be accordingly lowered down.

Figure 3:
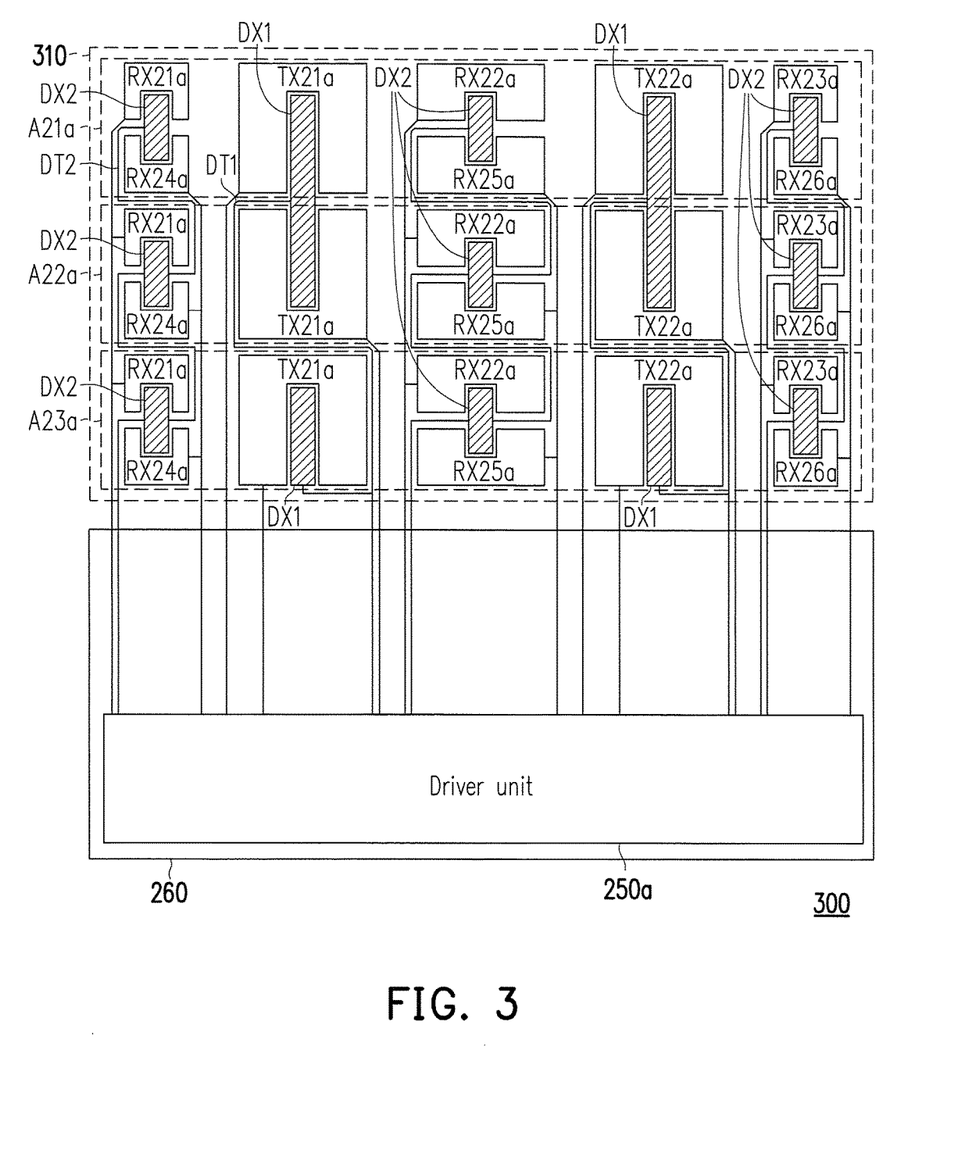
FIG. 3 schematically illustrates circuitry of a touch apparatus according to a third embodiment of the invention.

In general, the touch apparatus 200 can be applied to a portable apparatus, and the touch apparatus 200 may utilize human body parts (e.g., a hand) as voltage reference points (i.e., the reference point); however, once the portable apparatus is placed on a table, a hollow effect may arise, which may affect the operation of the touch panel. Hence, the touch apparatus 200 may be further improved in response to the hollow effect. FIG. 3 schematically illustrates circuitry of a touch apparatus according to a third embodiment of the invention. With reference to FIG. 2 and FIG. 3, the same or similar devices share the same or similar reference numbers. In the present embodiment, the structures of the touch apparatus 300 and the touch apparatus 200 as well as the ways to operate the touch apparatus 300 and the touch apparatus 200 are substantially the same, and therefore the descriptions of signals are omitted hereinafter. The difference between the touch apparatuses 300 and 200 lies in that the touch panel 310 further includes a plurality of first reserved electrodes DX1 and a plurality of second reserved electrodes DX2, and the similarities of the touch apparatuses 300 and 200 are explained in the previous embodiment shown in FIG. 2 and thus will not be further elaborated below.

In the present embodiment, the first transmitter electrodes TX21a of adjacent touch sections (e.g., A21a-A23a) surround the corresponding first reserved electrodes DX1. For instance, the first transmitter electrode TX21a of the touch section A21a and the first transmitter electrode TX21a of the touch section A22a adjacent to the touch section A21a surround the corresponding first reserved electrode DX1. Besides, the second transmitter electrodes TX22a of adjacent touch sections (e.g., A21a-A23a) surround the corresponding first reserved electrodes DX1. For instance, the second transmitter electrode TX22a of the touch section A21a and the second transmitter electrode TX22a of the touch section A22a adjacent to the touch section A21a surround the corresponding first reserved electrode DX1. Here, the first transmitter electrodes TX21a and the second transmitters TX22a constitute grooves to accommodate the corresponding first reserved electrodes DX1.

In addition, the first receiver electrode RX21a and the fourth receiver electrode RX24a of each of the touch sections (e.g., A21a-A23a) surround a corresponding one of the second reserved electrodes DX2, the second receiver electrode RX22a and the fifth receiver electrode RX25a of each of the touch sections (e.g., A21a-A23a) surround a corresponding one of the second reserved electrodes DX2, and the third receiver electrode RX23a and the sixth receiver electrode RX26a of each of the touch sections (e.g., A21a-A23a) surround a corresponding one of the second reserved electrodes DX2. Here, the first receiver electrode RX21a, the second receiver electrode RX22a, the third receiver electrode RX23a, the fourth receiver electrode RX24a, the fifth receiver electrode RX25a, and the sixth receiver electrode RX26a constitute grooves to accommodate the corresponding second reserved electrodes DX2.

In the present embodiment, the first reserved electrodes DX1 can be electrically connected through a plurality of first reserved traces DT1, and the second reserved electrodes DX2 can be electrically connected through a plurality of second reserved traces DT2. If the touch panel 310 is built in a liquid crystal display (LCD) panel, the driver unit 250a may apply a ground voltage (e.g., at 0 V) to the first reserved traces DT1 and the second reserved traces DT2, so as to prevent charges from being stored in the first reserved electrodes DX1 and the second reserved electrodes DX2 and thus avoid negative impact on the display performance of the LCD panel. If the touch panel 310 is neither built in nor arranged on the LCD panel, the first reserved traces DT1 and the second reserved traces DT2 can be floating because the charges in the first reserved electrodes DX1 and the second reserved electrodes DX2 do not affect the display performance of the LCD panel. Thereby, when the touch panel is operated without employing human body parts as reference ground points, the first transmitter electrode TX21a, the second transmitter electrode TX22a, the first receiver electrode RX21a, the second receiver electrode RX22a, the third receiver electrode RX23a, the fourth receiver electrode RX24a, the fifth receiver electrode RX25a, and the sixth receiver electrode RX26a constituting the grooves are characterized by great touch sensitivity, so as to relieve the influence of the hollow effect on the touch panel. The first reserved electrodes DX1 and the second reserved electrodes DX2 serve to prevent the grooves from deteriorating the display performance of the display panel (not shown).

Figure 4:
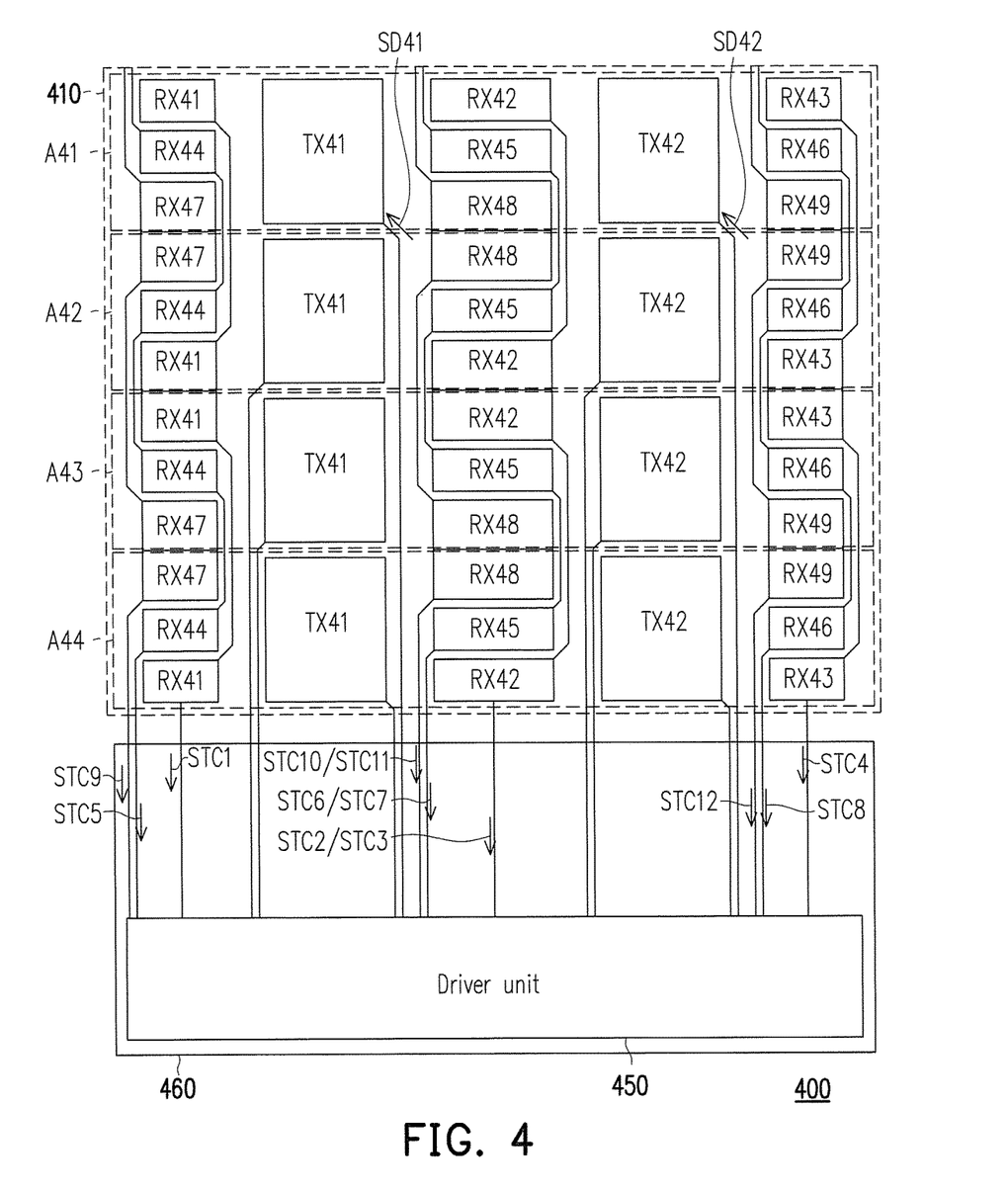
FIG. 4 schematically illustrates circuitry of a touch apparatus according to a fourth embodiment of the invention.

FIG. 4 schematically illustrates circuitry of a touch apparatus according to a fourth embodiment of the invention. With reference to FIG. 4, the touch apparatus 400 includes a touch panel 410 and a driver unit 450. Here, traces between the touch panel 410 and the driver unit 450 can be arranged on a flexible substrate 460, and the touch resolution of the touch panel 410 is exemplified as 4×12.

According to the present embodiment, the touch panel 410 includes a plurality of touch sections A41 to A44, for instance, and the circuit structure of the touch sections A41 to A44 and the way to operate the touch sections A41 to A44 are substantially the same. For instance, the touch section A41 includes a first transmitter electrode TX41, a second transmitter electrode TX42, a first receiver electrode RX41, a second receiver electrode RX42, a third receiver electrode RX43, a fourth receiver electrode RX44, a fifth receiver electrode RX45, a sixth receiver electrode RX46, a seventh receiver electrode RX47, an eighth receiver electrode RX48, and a ninth receiver electrode RX49.

In the present embodiment, the first receiver electrode RX41 adjoins a first side (e.g., the left side) of the first transmitter electrode TX41. The second receiver electrode RX42 adjoins the second side (e.g., the right side) of the first transmitter electrode TX41 and the third side (e.g., the left side) of the second transmitter electrode TX42. The third receiver electrode RX43 adjoins the fourth side (e.g., the right side) of the second transmitter electrode TX42. The fourth receiver electrode RX44 adjoins the first side of the first transmitter electrode TX41 and the first receiver electrode RX41. The fifth receiver electrode RX45 adjoins the second side of the first transmitter electrode TX41, the third side of the second transmitter electrode TX42, and the second receiver electrode RX42. The sixth receiver electrode RX46 adjoins the fourth side of the second transmitter electrode TX42 and the third receiver electrode RX43. The seventh receiver electrode RX47 adjoins the first side of the first transmitter electrode TX41 and the fourth receiver electrode RX44. The eighth receiver electrode RX48 adjoins the second side of the first transmitter electrode TX41, the third side of the second transmitter electrode TX42, and the fifth receiver electrode RX45. The ninth receiver electrode RX49 adjoins the fourth side of the second transmitter electrode TX42 and the sixth receiver electrode RX46. In addition, the touch sections A42 to A44 are similar to the touch section A41 and thus will not be further explained hereinafter.

As shown in FIG. 4, in the touch section A41 provided herein, the first receiver electrode RX41 closely adjoins the left side of the first transmitter electrode TX41 and the top side of the fourth receiver electrode RX44, the second receiver electrode RX42 closely adjoins the right side of the first transmitter electrode TX41, the left side of the second transmitter electrode TX42, and the top side of the fifth receiver electrode RX45, the third receiver electrode RX43 closely adjoins the right side of the second transmitter electrode TX42 and the top side of the sixth receiver electrode RX46, the fourth receiver electrode RX44 closely adjoins the bottom side of the first receiver electrode RX41, the top side of the seventh receiver electrode RX47, and the left side of the first transmitter electrode TX41, the fifth receiver electrode RX45 closely adjoins the bottom side of the second receiver electrode RX42, the top side of the eighth receiver electrode RX48, the right side of the first transmitter electrode TX41, and the left side of the second transmitter electrode TX42, the sixth receiver electrode RX46 closely adjoins the bottom side of the third receiver electrode RX43, the top side of the ninth receiver electrode RX49, and the right side of the second transmitter electrode TX42, the seventh receiver electrode RX47 closely adjoins the bottom side of the fourth receiver electrode RX44 and the left side of the first transmitter electrode TX41, the eighth receiver electrode RX48 closely adjoins the bottom side of the fifth receiver electrode RX45, the right side of the first transmitter electrode TX41, and the left side of the second transmitter electrode TX42, and the ninth receiver electrode RX49 closely adjoins the bottom side of the sixth receiver electrode RX46 and the right side of the second transmitter electrode TX42. The arrangement of electrodes of the touch sections A42 to A44 is similar to that of the touch section A41 and thus will not be further explained hereinafter.

As shown in FIG. 4, the seventh receiver electrode RX47 of the touch section A41 is in physical contact with the seventh receiver electrode RX47 of the adjacent touch section A42, the eighth receiver electrode RX48 of the touch section A41 is in physical contact with the eighth receiver electrode RX48 of the adjacent touch section A42, and the ninth receiver electrode RX49 of the touch section A41 is in physical contact with the ninth receiver electrode RX49 of the adjacent touch section A42. The first receiver electrode RX41 of the touch section A42 is in physical contact with the first receiver electrode RX41 of the adjacent touch section A43, the second receiver electrode RX42 of the touch section A42 is in physical contact with the second receiver electrode RX42 of the adjacent touch section A43, and the third receiver electrode RX43 of the touch section A42 is in physical contact with the third receiver electrode RX43 of the adjacent touch section A43. The rest can be deduced from the above as shown in FIG. 4 and thus will not be further explained.

In the touch section A41, if the first transmitter electrode TX41 receives a first driver signal SD41, the first receiver electrode RX41 is coupled to the first driver signal SD41 and provides a first touch signal STC1, the second receiver electrode RX42 is coupled to the first driver signal SD41 and provides a second touch signal STC2, the fourth receiver electrode RX44 is coupled to the first driver signal SD41 and provides a fifth touch signal STC5, the fifth receiver electrode RX45 is coupled to the first driver signal SD41 and provides a sixth touch signal STC6, the seventh receiver electrode RX47 is coupled to the first driver signal SD41 and provides a ninth touch signal STC9, and the eighth receiver electrode RX48 is coupled to the first driver signal SD41 and provides a tenth touch signal STC10. The first touch signal STC1, the second touch signal STC2, the fifth touch signal STC5, the sixth touch signal STC6, the ninth touch signal STC9, and the tenth touch signal STC10 can be provided simultaneously or sequentially. That is, the first driver signal SD41 coupled to the first receiver electrode RX41, coupled to the fourth receiver electrode RX44, and coupled to the seventh receiver electrode RX47 may be the same as or different from the first driver signal SD41 coupled to the second receiver electrode RX42, coupled to the fifth receiver electrode RX45, and coupled to the eighth receiver electrode RX48.

If the second transmitter electrode TX42 receives a second driver signal SD42, the second receiver electrode RX42 is coupled to the second driver signal SD42 and provides a third touch signal STC3, the third receiver electrode RX43 is coupled to the second driver signal SD42 and provides a fourth touch signal STC4, the fifth receiver electrode RX45 is coupled to the second driver signal SD42 and provides a seventh touch signal STC7, the sixth receiver electrode RX46 is coupled to the second driver signal SD42 and provides an eighth touch signal STC8, the eighth receiver electrode RX48 is coupled to the second driver signal SD42 and provides an eleventh touch signal STC11, and the ninth receiver electrode RX49 is coupled to the second driver signal SD42 and provides a twelfth touch signal STC12. The third touch signal STC3, the fourth touch signal STC4, the seventh touch signal STC7, the eighth touch signal STC8, the eleventh touch signal STC11, and the twelfth touch signal STC12 can be provided simultaneously or sequentially. That is, the second driver signal SD42 coupled to the second receiver electrode RX42, coupled to the fifth receiver electrode RX45, and coupled to the eighth receiver electrode RX48 may be the same as or different from the second driver signal SD42 coupled to the third receiver electrode RX43, coupled to the sixth receiver electrode RX46, and coupled to the ninth receiver electrode RX49.

In light of the above, when the touch apparatus 400 senses a touch action of a user, the driver unit 450 is able to determine the position of the touch action according to the time at which the driver signal (e.g., SD41 or SD42) is provided and the received touch signal (e.g., one of STC1-STC12).

According to the arrangement of electrodes provided in the present embodiment, the first transmitter electrode TX41 corresponds to the first receiver electrode RX41, the second receiver electrode RX42, the fourth receiver electrode RX44, the fifth receiver electrode RX45, the seventh receiver electrode RX47, and the eighth receiver electrode RX48; the second transmitter electrode TX42 corresponds to the second receiver electrode RX42, the third receiver electrode RX43, the fifth receiver electrode RX45, the sixth receiver RX46, the eighth receiver electrode RX48, and the ninth receiver electrode RX49. That is, the first receiver electrode RX41, the second receiver electrode RX42, the fourth receiver electrode RX44, the fifth receiver electrode RX45, the seventh receiver electrode RX47, and the eighth receiver electrode RX48 share the first transmitter electrode TX41, the second receiver electrode RX42, the third receiver electrode RX43, the fifth receiver electrode RX45, the sixth receiver RX46, the eighth receiver electrode RX48, and the ninth receiver electrode RX49 share the second transmitter electrode TX42, and the first transmitter electrode TX41 and the second transmitter electrode TX42 share the second receiver electrode RX42, the fifth receiver electrode RX45, and the eighth receiver electrode RX48. Thereby, the number of the arranged electrodes of the touch panel 410 provided herein is correspondingly reduced; as such, the number of traces can be reduced as well, and the hardware costs of the touch apparatus 400 can be accordingly lowered down.

Figure 5:
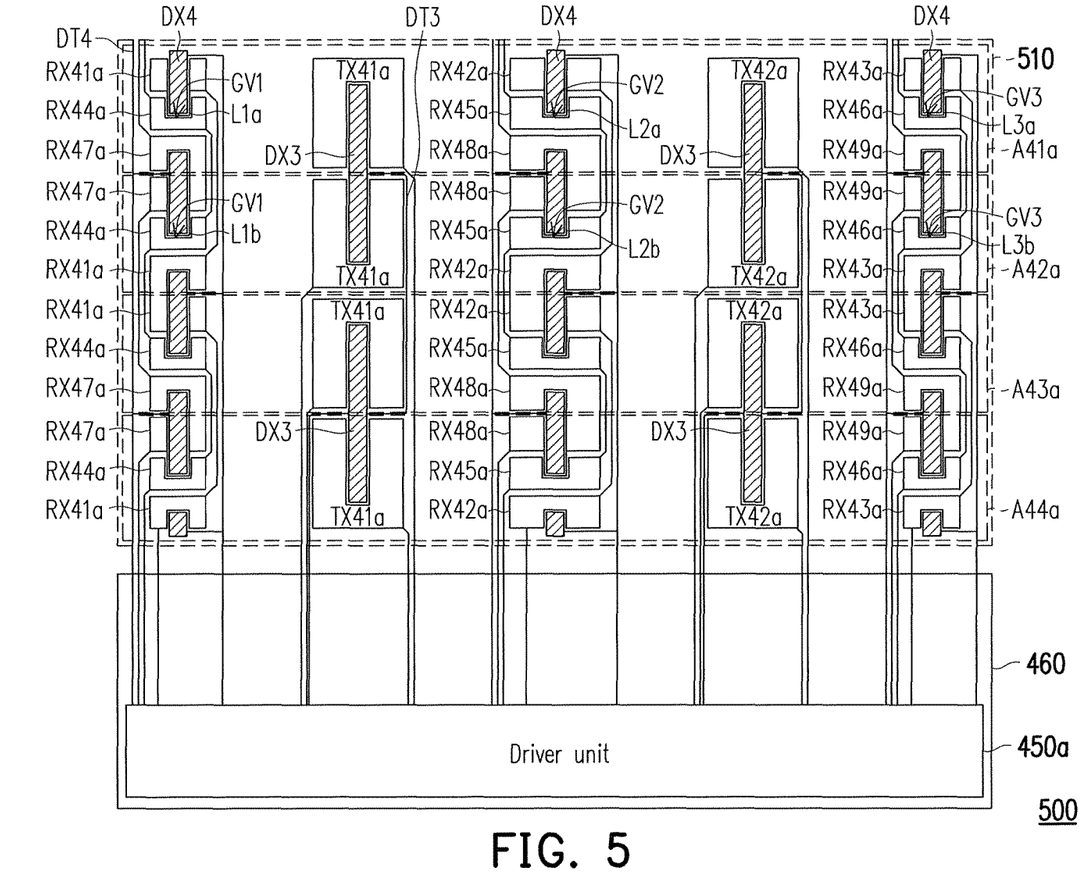
FIG. 5 schematically illustrates circuitry of a touch apparatus according to a fifth embodiment of the invention.

The touch panel of the touch apparatus 400 may be subject to the hollow effect; in response thereto, the touch apparatus 400 may also be further improved. FIG. 5 schematically illustrates circuitry of a touch apparatus according to a fifth embodiment of the invention. With reference to FIG. 4 and FIG. 5, the same or similar devices share the same or similar reference numbers. In the present embodiment, the structures of the touch apparatus 500 and the touch apparatus 400 as well as the ways to operate the touch apparatus 500 and the touch apparatus 400 are substantially the same, and therefore the descriptions of signals are omitted hereinafter. The difference between the touch apparatuses 500 and 400 lies in that the touch panel 510 further includes a plurality of third reserved electrodes DX3 and a plurality of fourth reserved electrodes DX4, and the similarities of the touch apparatuses 500 and 400 are explained in the previous embodiment shown in FIG. 4 and thus will not be further elaborated below.

In the present embodiment, the first transmitter electrodes TX41a of adjacent touch sections (e.g., A41a-A44a) surround the corresponding third reserved electrodes DX3. For instance, the first transmitter electrode TX41a of the touch section A41a and the first transmitter electrode TX41a of the touch section A42a adjacent to the touch section A41a surround the corresponding third reserved electrode DX3. Besides, the second transmitter electrodes TX42a of adjacent touch sections (e.g., A41a-A44a) surround the corresponding third reserved electrodes DX3. For instance, the second transmitter electrode TX42a of the touch section A41a and the second transmitter electrode TX42a of the touch section A42a adjacent to the touch section A41a surround the corresponding third reserved electrode DX3. Here, the first transmitter electrodes TX41a and the second transmitters TX42a constitute grooves to accommodate the corresponding third reserved electrodes DX3.

In the touch sections (e.g., A41a-A44a), the first receiver electrodes RX41a in physical contact with each other and the adjacent fourth receiver electrode RX44a surround a corresponding one of the fourth reserved electrodes DX4. For instance, the first receiver electrodes RX41a in the touch sections A42a and A43a are in physical contact with each other, and the first receiver electrodes RX41a and the underlying adjacent fourth receiver electrode RX44a surround the corresponding fourth reserved electrode DX4. In the touch sections (e.g., A41a-A44a), the second receiver electrodes RX42a in physical contact with each other and the adjacent fifth receiver electrode RX45a surround a corresponding one of the fourth reserved electrodes DX4. For instance, the second receiver electrodes RX42a in the touch sections A42a and A43a are in physical contact with each other, and the second receiver electrodes RX42a and the underlying adjacent fifth receiver electrode RX45a surround the corresponding fourth reserved electrode DX4.

In the touch sections (e.g., A41a-A44a), the third receiver electrodes RX43a in physical contact with each other and the adjacent sixth receiver electrode RX46a surround a corresponding one of the fourth reserved electrodes DX4. For instance, the third receiver electrodes RX43a in the touch sections A42a and A43a are in physical contact with each other, and the third receiver electrodes RX43a and the underlying adjacent sixth receiver electrode RX46a surround the corresponding fourth reserved electrode DX4. In the touch sections (e.g., A41a-A44a), the seventh receiver electrodes RX47a in physical contact with each other and the adjacent fourth receiver electrode RX44a surround a corresponding one of the fourth reserved electrodes DX4. For instance, the seventh receiver electrodes RX47a in the touch sections A41a and A42a are in physical contact with each other, and the seventh receiver electrodes RX47a and the underlying adjacent fourth receiver electrode RX44a surround the corresponding fourth reserved electrode DX4.

In the touch sections (e.g., A41a-A44a), the eighth receiver electrodes RX48a in physical contact with each other and the adjacent fifth receiver electrode RX45a surround a corresponding one of the fourth reserved electrodes DX4. For instance, the eighth receiver electrodes RX48a in the touch sections A41a and A42a are in physical contact with each other, and the eighth receiver electrodes RX48a and the underlying adjacent fifth receiver electrode RX45a surround the corresponding fourth reserved electrode DX4. In the touch sections (e.g., A41a-A44a), the ninth receiver electrodes RX49a in physical contact with each other and the adjacent sixth receiver electrode RX46a surround a corresponding one of the fourth reserved electrodes DX4. For instance, the ninth receiver electrodes RX49a in the touch sections A41a and A42a are in physical contact with each other, and the ninth receiver electrodes RX49a and the underlying adjacent sixth receiver electrode RX46a surround the corresponding fourth reserved electrode DX4.

Here, parts of the first receiver electrode RX41a, the second receiver electrode RX42a, the third receiver electrode RX43a, the seventh receiver electrode RX47a, the eighth receiver electrode RX48a, and the ninth receiver electrode RX49a constitute grooves to accommodate the corresponding fourth reserved electrodes DX4, and the other parts of the first receiver electrode RX41a, the second receiver electrode RX42a, the third receiver electrode RX43a, the seventh receiver electrode RX47a, the eighth receiver electrode RX48a, and the ninth receiver electrode RX49a are each cut into two pieces to surround the corresponding fourth reserved electrodes DX4. All of the fourth receiver electrodes RX44a, the fifth receiver electrodes RX45a, and the sixth receiver electrodes RX46a constitute grooves to accommodate the corresponding fourth reserved electrodes DX4.

To be specific, the two pieces of the first receiver electrode RX41a are electrically connected through the first connection trace L1a, and the adjacent fourth receiver electrode RX44a constitutes the first groove GV1 to accommodate the first connection trace L1a; for instance, the first groove GV1 of the underlying adjacent fourth receiver electrode RX44a accommodates the first connection trace L1a. The two pieces of the seventh receiver electrodes RX47a are electrically connected through the first connection trace L1b, and the adjacent fourth receiver electrode RX44a constitutes the first groove GV1 to accommodate the first connection trace L1a; for instance, the first groove GV1 of the underlying adjacent fourth receiver electrode RX44a accommodates the first connection trace L1b.

The two pieces of the second receiver electrodes RX42a are electrically connected through the second connection trace L2a, and the adjacent fifth receiver electrode RX45a constitutes the second groove GV2 to accommodate the second connection trace L2a; for instance, the second groove GV2 of the underlying adjacent fifth receiver electrode RX45a accommodates the second connection trace L2a. The two pieces of the eighth receiver electrodes RX48a are electrically connected through the second connection trace L2b, and the adjacent fifth receiver electrode RX45a constitutes the second groove GV2 to accommodate the second connection trace L2b; for instance, the second groove GV2 of the underlying adjacent fifth receiver electrode RX45a accommodates the second connection trace L2b.

The two pieces of the third receiver electrodes RX43a are electrically connected through the third connection trace L3a, and the adjacent sixth receiver electrode RX46a constitutes the third groove GV3 to accommodate the third connection trace L3a; for instance, the third groove GV3 of the underlying adjacent sixth receiver electrode RX46a accommodates the third connection trace L3a. The two pieces of the ninth receiver electrodes RX49a are electrically connected through the third connection trace L3b, and the adjacent sixth receiver electrode RX46a constitutes the third groove GV3 to accommodate the third connection trace L3b; for instance, the third groove GV3 of the underlying adjacent sixth receiver electrode RX46a accommodates the third connection trace L3b.

In the present embodiment, the third reserved electrodes DX3 can be electrically connected through a plurality of third reserved traces DT3, and the fourth reserved electrodes DX4 can be electrically connected through a plurality of fourth reserved traces DT4. If the touch panel 510 is built in an LCD panel, the driver unit 450a may apply a ground voltage (e.g., at 0 V) to the third reserved traces DT3 and the fourth reserved traces DT4, so as to prevent charges from being stored in the third reserved traces DT3 and the fourth reserved traces DT4 and thus avoid negative impact on the display performance of the LCD panel. If the touch panel 510 is neither built in nor arranged on the LCD panel, the third reserved traces DT3 and the fourth reserved traces DT4 can be floating because the charges in the third reserved electrodes DX3 and the fourth reserved electrodes DX4 do not affect the display performance of the LCD panel. Thereby, when the touch panel is operated without employing human body parts as reference ground points, the first transmitter electrode TX41a, the second transmitter electrode TX42a, the first receiver electrode RX41a, the second receiver electrode RX42a, the third receiver electrode RX43a, the fourth receiver electrode RX44a, the fifth receiver electrode RX45a, the sixth receiver electrode RX46a, the seventh receiver electrode RX47a, the eighth receiver electrode RX48a, and the ninth receiver electrode RX49a which constitute the grooves or are cut are characterized by great touch sensitivity, so as to relieve the influence of the hollow effect on the touch panel. The third reserved electrodes DX3 and the fourth reserved electrodes DX4 serve to prevent the hollow parts (e.g., the grooves or the cut-open portions) from affecting the display performance of the display panel (not shown).

Figure 6:
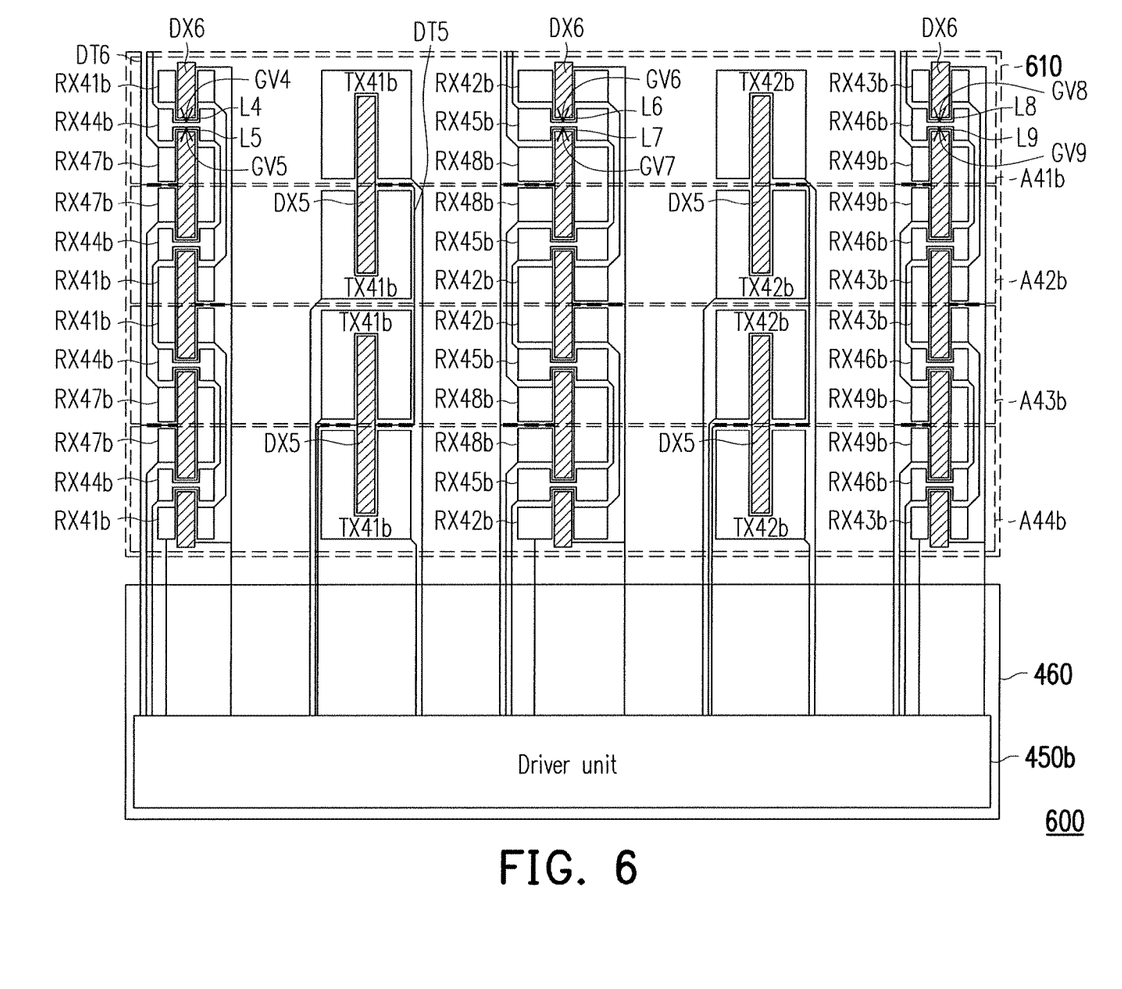
FIG. 6 schematically illustrates circuitry of a touch apparatus according to a sixth embodiment of the invention.

FIG. 6 schematically illustrates circuitry of a touch apparatus according to a sixth embodiment of the invention. With reference to FIG. 4 and FIG. 6, the same or similar devices share the same or similar reference numbers. In the present embodiment, the structures of the touch apparatus 600 and the touch apparatus 400 as well as the ways to operate the touch apparatus 600 and the touch apparatus 400 are substantially the same, and therefore the descriptions of signals are omitted hereinafter. The difference between the touch apparatuses 600 and 400 lies in that the touch panel 610 further includes a plurality of fifth reserved electrodes DX5 and a plurality of sixth reserved electrodes DX6, and the similarities of the touch apparatuses 600 and 400 are explained in the previous embodiment shown in FIG. 4 and thus will not be further elaborated below.

In the present embodiment, the first transmitter electrodes TX41b of adjacent touch sections (e.g., A41b-A44b) surround the corresponding fifth reserved electrodes DX5. For instance, the first transmitter electrode TX41b of the touch section A41b and the first transmitter electrode TX41b of the touch section A42b adjacent to the touch section A41b surround the corresponding fifth reserved electrode DX5. Besides, the second transmitter electrodes TX42b of adjacent touch sections (e.g., A41b-A44b) surround the corresponding fifth reserved electrodes DX5. For instance, the second transmitter electrode TX42b of the touch section A41b and the second transmitter electrode TX42b of the touch section A42b adjacent to the touch section A41b surround the corresponding fifth reserved electrode DX5. Here, the first transmitter electrodes TX41b and the second transmitters TX42b constitute grooves to accommodate the corresponding fifth reserved electrodes DX5.

In addition, the first receiver electrode RX41b and the fourth receiver electrode RX44b of each of the touch sections (e.g., A41b-A44b) and the first receiver electrode RX41b and the fourth receiver electrode RX44b of the adjacent touch section surround a corresponding one of the sixth reserved electrodes DX6. For instance, the first receiver electrode RX41b and the fourth receiver electrode RX44b of the touch section A42b and the first receiver electrode RX41b and the fourth receiver electrode RX44b of the adjacent touch section A43b surround the corresponding sixth reserved electrode DX6.

The second receiver electrode RX42b and the fifth receiver electrode RX45b of each of the touch sections (e.g., A41b-A44b) and the second receiver electrode RX42b and the fifth receiver electrode RX45b of the adjacent touch section surround a corresponding one of the sixth reserved electrodes DX6. For instance, the second receiver electrode RX42b and the fifth receiver electrode RX45b of the touch section A42b and the second receiver electrode RX42b and the fifth receiver electrode RX45b of the adjacent touch section A43b surround the corresponding sixth reserved electrode DX6.

The third receiver electrode RX43b and the sixth receiver electrode RX46b of each of the touch sections (e.g., A41b-A44b) and the third receiver electrode RX43b and the sixth receiver electrode RX46b of the adjacent touch section surround a corresponding one of the sixth reserved electrodes DX6. For instance, the third receiver electrode RX43b and the sixth receiver electrode RX46b of the touch section A42b and the third receiver electrode RX43b and the sixth receiver electrode RX46b of the adjacent touch section A43b surround the corresponding sixth reserved electrode DX6.

The fourth receiver electrode RX44b and the seventh receiver electrode RX47b of each of the touch sections (e.g., A41b-A44b) and the fourth receiver electrode RX44b and the seventh receiver electrode RX47b of the adjacent touch section surround a corresponding one of the sixth reserved electrodes DX6. For instance, the fourth receiver electrode RX44b and the seventh receiver electrode RX47b of the touch section A41b and the fourth receiver electrode RX44b and the seventh receiver electrode RX47b of the adjacent touch section A42b surround the corresponding sixth reserved electrode DX6.

The fifth receiver electrode RX45b and the eighth receiver electrode RX48b of each of the touch sections (e.g., A41b-A44b) and the fifth receiver electrode RX45b and the eighth receiver electrode RX48b of the adjacent touch section surround a corresponding one of the sixth reserved electrodes DX6. For instance, the fifth receiver electrode RX45b and the eighth receiver electrode RX48b of the touch section A41b and the fifth receiver electrode RX45b and the eighth receiver electrode RX48b of the adjacent touch section A42b surround the corresponding sixth reserved electrode DX6.

The sixth receiver electrode RX46b and the ninth receiver electrode RX49b of each of the touch sections (e.g., A41b-A44b) and the sixth receiver electrode RX46b and the ninth receiver electrode RX49b of the adjacent touch section surround a corresponding one of the sixth reserved electrodes DX6. For instance, the sixth receiver electrode RX46b and the ninth receiver electrode RX49b of the touch section A41b and the sixth receiver electrode RX46b and the ninth receiver electrode RX49b of the adjacent touch section A42b surround the corresponding sixth reserved electrode DX6.

Here, each of the first receiver electrode RX41b, the second receiver electrode RX42b, the third receiver electrode RX43b, the seventh receiver electrode RX47b, the eighth receiver electrode RX48b, and the ninth receiver electrode RX49b is cut into two pieces to surround one of the corresponding sixth reserved electrodes DX6. All of the fourth receiver electrodes RX44b, the fifth receiver electrodes RX45b, and the sixth receiver electrodes RX46b constitute grooves to accommodate the corresponding sixth reserved electrodes DX6.

To be specific, the two pieces of the first receiver electrode RX41b are electrically connected through the fourth connection trace L4, and the fourth receiver electrode RX44b constitutes the fourth groove GV4 to accommodate the fourth connection trace L4. The two pieces of the seventh receiver electrode RX47b are electrically connected through the fifth connection trace L5, and the fourth receiver electrode RX44b constitutes the fifth groove GV5 to accommodate the fifth connection trace L5.

The two pieces of the second receiver electrode RX42b are electrically connected through the sixth connection trace L6, and the fifth receiver electrode RX45b constitutes the sixth groove GV6 to accommodate the sixth connection trace L6. The two pieces of the eighth receiver electrode RX48b are electrically connected through the seventh connection trace L7, and the fifth receiver electrode RX45b constitutes the seventh groove GV7 to accommodate the seventh connection trace L7.

The two pieces of the third receiver electrode RX43b are electrically connected through the eighth connection trace L8, and the sixth receiver electrode RX46b constitutes the eighth groove GV8 to accommodate the eighth connection trace L8. The two pieces of the ninth receiver electrode RX49b are electrically connected through the eighth connection trace L9, and the sixth receiver electrode RX46b constitutes the ninth groove GV9 to accommodate the ninth connection trace L9.

In the present embodiment, the fifth reserved electrodes DX5 can be electrically connected through a plurality of fifth reserved traces DT5, and the sixth reserved electrodes DX6 can be electrically connected through a plurality of sixth reserved traces DT6. If the touch panel 610 is built in an LCD panel, the driver unit 450b may apply a ground voltage (e.g., at 0 V) to the fifth reserved traces DT5 and the sixth reserved traces DT6, so as to prevent charges from being stored in the fifth reserved electrodes DX5 and the sixth reserved electrodes DX6 and thus avoid negative impact on the display performance of the LCD panel. If the touch panel 610 is neither built in nor arranged on the LCD panel, the fifth reserved traces DT5 and the sixth reserved traces DT6 can be floating because the charges in the fifth reserved electrodes DX5 and the sixth reserved electrodes DX6 do not affect the display performance of the LCD panel. Thereby, when the touch panel is operated without employing human body parts as reference ground points, the first transmitter electrode TX41b, the second transmitter electrode TX42b, the first receiver electrode RX41b, the second receiver electrode RX42b, the third receiver electrode RX43b, the fourth receiver electrode RX44b, the fifth receiver electrode RX45b, the sixth receiver electrode RX46b, the seventh receiver electrode RX47b, the eighth receiver electrode RX48b, and the ninth receiver electrode RX49b which constitute the grooves or are cut are characterized by great touch sensitivity, so as to relieve the influence of the hollow effect on the touch panel. The fifth reserved electrodes DX5 and the sixth reserved electrodes DX6 serve to prevent the hollow parts (e.g., the grooves or the cut-open portions) from affecting the display performance of the display panel (not shown).

Figure 7:
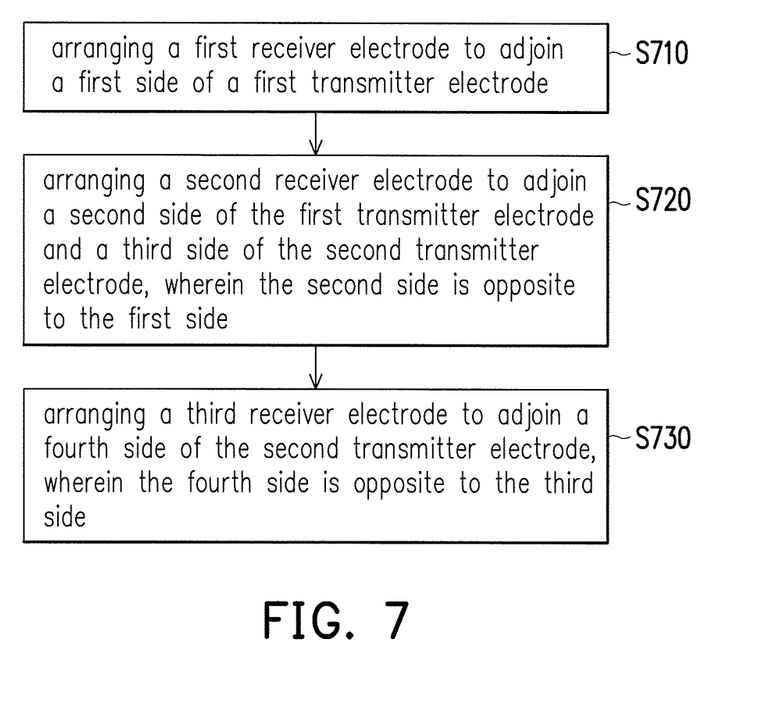
FIG. 7 is a flow chart illustrating a method for arranging electrodes of a touch panel according to an embodiment of the invention.

FIG. 7 is a flow chart illustrating a method for arranging electrodes of a touch panel according to an embodiment of the invention. The method depicted in FIG. 7 is at least suitable for the touch panels respectively described in the previous embodiments. In the present embodiment, the touch panel includes a plurality of touch sections, and each of the touch sections includes a first transmitter electrode, a first receiver electrode, a second transmitter electrode, a second receiver electrode, and a third receiver electrode. In the method for arranging electrodes of the touch panel, the first receiver electrode is arranged to adjoin a first side of the first transmitter electrode in step S710. In step S720, the second receiver electrode is arranged to adjoin a second side of the first transmitter electrode and a third side of the second transmitter electrode, and the second side is opposite to the first side. In step S730, the third receiver electrode is arranged to adjoin a fourth side of the second transmitter electrode, and the fourth side is opposite to the third side. The order of the steps S710-S730 is exemplary and should not be construed as a limitation to the invention. Details of these steps can be found in the previous embodiments shown in FIG. 1 to FIG. 6 and thus will not be further explained hereinafter.

To sum up, according to the touch panel and the method for arranging the electrodes of the touch panel, sharing the receiver electrodes and the transmitter electrodes allows the number of traces of the touch panel to be reduced, such that the hardware costs of the touch apparatus can be lowered down. Moreover, the reserved electrodes of the touch panel provided herein may lessen the hollow effect upon the receiver electrodes and the transmitter electrodes.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A touch panel comprising:
a plurality of touch sections, each of the touch sections comprising:
a first transmitter electrode having a first side and a second side opposite to the first side;
a first receiver electrode adjoining the first side;
a second transmitter electrode having a third side and a fourth side opposite to the third side;
a second receiver electrode adjoining the second side and the third side; and
a third receiver electrode adjoining the fourth side,
wherein when the first transmitter electrode receives a first driver signal, the first receiver electrode senses the first driver signal from the first transmitter electrode to generate a first touch signal while the second receiver electrode also senses the first driver signal from the first transmitter electrode to generate a second touch signal, and
wherein when the second transmitter electrode receives a second driver signal different from the first driver signal, the second receiver electrode senses the second driver signal from the second transmitter electrode to generate a third touch signal while the third receiver electrode also senses the second driver signal from the second transmitter to generate a fourth touch signal,
wherein the same second receiver electrode senses the first driver signal from the first transmitter electrode and the second driver signal from the second transmitter electrode.

2. The touch panel of claim 1, wherein each of the touch sections further comprises:
a fourth receiver electrode adjoining the first side and the first receiver electrode;
a fifth receiver electrode adjoining the second side, the third side, and the second receiver electrode; and
a sixth receiver electrode adjoining the fourth side and the third receiver electrode.

3. The touch panel of claim 2, wherein when the first transmitter electrode receives the first driver signal, the fourth receiver electrode generates a fifth touch signal while the fifth receiver electrode generates a sixth touch signal, and when the second transmitter electrode receives the second driver signal, the fifth receiver electrode generates a seventh touch signal while the sixth receiver electrode generates an eighth touch signal.

4. The touch panel of claim 3, wherein each of the touch sections further comprises:
a seventh receiver electrode adjoining the first side and the fourth receiver electrode;
an eighth receiver electrode adjoining the second side, the third side, and the fifth receiver electrode; and
a ninth receiver electrode adjoining the fourth side and the sixth receiver electrode.

5. The touch panel of claim 4, wherein when the first transmitter electrode receives the first driver signal, the seventh receiver electrode generates a ninth touch signal, and the eighth receiver electrode generates a tenth touch signal, and when the second transmitter electrode receives the second driver signal, the eighth receiver electrode generates an eleventh touch signal, and the ninth receiver electrode generates a twelfth touch signal.

6. The touch panel of claim 4, wherein the first receiver electrode of each of the touch sections is in physical contact with the first receiver electrode of one of the touch sections adjacent to the each of the touch sections, the second receiver electrode of each of the touch sections is in physical contact with the second receiver electrode of one of the touch sections adjacent to the each of the touch sections, the third receiver electrode of each of the touch sections is in physical contact with the third receiver electrode of one of the touch sections adjacent to the each of the touch sections, the seventh receiver electrode of each of the touch sections is in physical contact with the seventh receiver electrode of one of the touch sections adjacent to the each of the touch sections, the eighth receiver electrode of each of the touch sections is in physical contact with the eighth receiver electrode of one of the touch sections adjacent to the each of the touch sections, and the ninth receiver electrode of each of the touch sections is in physical contact with the ninth receiver electrode of one of the touch sections adjacent to the each of the touch sections.

7. The touch panel of claim 6, further comprising a plurality of third reserved electrodes and a plurality of fourth reserved electrodes, the first transmitter electrode of one of the touch sections and the first transmitter electrode of another one of the touch sections adjacent to the each of the touch sections surround a corresponding one of the third reserved electrodes, and the second transmitter electrode of one of the touch sections and the second transmitter electrode of another one of the touch sections adjacent to the each of the touch sections surround a corresponding one of the third reserved electrodes,
wherein the first receiver electrodes in physical contact with each other and the adjacent fourth receiver electrode surround a corresponding one of the fourth reserved electrodes, the second receiver electrodes in physical contact with each other and the adjacent fifth receiver electrode surround a corresponding one of the fourth reserved electrodes, the third receiver electrodes in physical contact with each other and the adjacent sixth receiver electrode surround a corresponding one of the fourth reserved electrodes, the seventh receiver electrodes in physical contact with each other and the adjacent fourth receiver electrode surround a corresponding one of the fourth reserved electrodes, the eighth receiver electrodes in physical contact with each other and the adjacent fifth receiver electrode surround a corresponding one of the fourth reserved electrodes, and the ninth receiver electrodes in physical contact with each other and the adjacent sixth receiver electrode surround a corresponding one of the fourth reserved electrodes.

8. The touch panel of claim 7, the third reserved electrodes being electrically connected through a plurality of third reserved traces, the fourth reserved electrodes being electrically connected through a plurality of fourth reserved traces, wherein if the touch panel is built in a liquid crystal display panel, a ground voltage is applied to the third reserved traces and the fourth reserved traces, and if the touch panel is neither built in nor arranged on the liquid crystal display panel, the third reserved traces and the fourth reserved traces are floating.

9. The touch panel of claim 7, wherein the fourth receiver electrode constitutes a first groove to accommodate a first connection trace of the adjacent first receiver electrode or the adjacent seventh receiver electrode, the fifth receiver electrode constitutes a second groove to accommodate a second connection trace of the adjacent second receiver electrode or the adjacent eighth receiver electrode, and the sixth receiver electrode constitutes a third groove to accommodate a third connection trace of the adjacent third receiver electrode or the adjacent ninth receiver electrode.

10. The touch panel of claim 6, further comprising a plurality of fifth reserved electrodes and a plurality of sixth reserved electrodes, the first transmitter electrode of one of the touch sections and the first transmitter electrode of another one of the touch sections adjacent to the each of the touch sections surround a corresponding one of the fifth reserved electrodes, and the second transmitter electrode of one of the touch sections and the second transmitter electrode of another one of the touch sections adjacent to the each of the touch sections surround a corresponding one of the fifth reserved electrodes, wherein the first receiver electrode and the fourth receiver electrode of each of the touch sections and the first receiver electrode and the fourth receiver electrode of one of the touch sections adjacent to the each of the touch sections surround a corresponding one of the sixth reserved electrodes, the second receiver electrode and the fifth receiver electrode of each of the touch sections and the second receiver electrode and the fifth receiver electrode of one of the touch sections adjacent to the each of the touch sections surround a corresponding one of the sixth reserved electrodes, the third receiver electrode and the sixth receiver electrode of each of the touch sections and the third receiver electrode and the sixth receiver electrode of one of the touch sections adjacent to the each of the touch sections surround a corresponding one of the sixth reserved electrodes, the fourth receiver electrode and the seventh receiver electrode of each of the touch sections and the fourth receiver electrode and the seventh receiver electrode of one of the touch sections adjacent to the each of the touch sections surround a corresponding one of the sixth reserved electrodes, the fifth receiver electrode and the eighth receiver electrode of each of the touch sections and the fifth receiver electrode and the eighth receiver electrode of one of the touch sections adjacent to the each of the touch sections surround a corresponding one of the sixth reserved electrodes, and the sixth receiver electrode and the ninth receiver electrode of each of the touch sections and the sixth receiver electrode and the ninth receiver electrode of one of the touch sections adjacent to the each of the touch sections surround a corresponding one of the sixth reserved electrodes.

11. The touch panel of claim 10, the fifth reserved electrodes being electrically connected through a plurality of fifth reserved traces, the sixth reserved electrodes being electrically connected through a plurality of sixth reserved traces, wherein if the touch panel is built in a liquid crystal display panel, a ground voltage is applied to the fifth reserved traces and the sixth reserved traces, and if the touch panel is neither built in nor arranged on the liquid crystal display panel, the fifth reserved traces and the sixth reserved traces are floating.

12. The touch panel of claim 11, wherein the fourth receiver electrode constitutes a fourth groove and a fifth groove to respectively accommodate a fourth connection trace of the adjacent first receiver electrode and a fifth connection trace of the adjacent seventh receiver electrode, the fifth receiver electrode constitutes a sixth groove and a seventh groove to respectively accommodate a sixth connection trace of the adjacent second receiver electrode and a seventh connection trace of the adjacent sixth receiver electrode, and the sixth receiver electrode constitutes an eighth groove and a ninth groove to respectively accommodate an eighth connection trace of the adjacent third receiver electrode and a ninth connection trace of the adjacent ninth receiver electrode.

13. The touch panel of claim 2, further comprising a plurality of first reserved electrodes and a plurality of second reserved electrodes, the first transmitter electrode of one of the touch sections and the first transmitter electrode of another one of the touch sections adjacent to the each of the touch sections surround a corresponding one of the first reserved electrodes, and the second transmitter electrode of one of the touch sections and the second transmitter electrode of another one of the touch sections adjacent to the each of the touch sections surround a corresponding one of the first reserved electrodes, the first receiver electrode and the fourth receiver electrode of each of the touch sections surround a corresponding one of the second reserved electrodes, the second receiver electrode and the fifth receiver electrode of each of the touch sections surround a corresponding one of the second reserved electrodes, and the third receiver electrode and the sixth receiver electrode of each of the touch sections surround a corresponding one of the second reserved electrodes.

14. The touch panel of claim 13, the first reserved electrodes being electrically connected through a plurality of first reserved traces, the second reserved electrodes being electrically connected through a plurality of second reserved traces, wherein if the touch panel is built in a liquid crystal display panel, a ground voltage is applied to the first reserved traces and the second reserved traces, and if the touch panel is neither built in nor arranged on the liquid crystal display panel, the first reserved traces and the second reserved traces are floating.

15. The touch panel of claim 1, wherein the first receiver electrodes of the touch sections are in physical contact, the second receiver electrodes of the touch sections are in physical contact, and the third receiver electrodes of the touch sections are in physical contact.

16. A method for arranging electrodes of a touch panel, the touch panel having a plurality of touch sections, each of the touch sections comprises a first transmitter electrode, a second transmitter electrode, a first receiver electrode, a second receiver electrode, and a third receiver electrode, the method comprising:

arranging the first receiver electrode to adjoin a first side of the first transmitter electrode;

arranging the second receiver electrode to adjoin a second side of the first transmitter electrode and a third side of the second transmitter electrode, wherein the second side is opposite to the first side; and arranging the third receiver electrode to adjoin a fourth side of the second transmitter electrode, wherein the fourth side is opposite to the third side, wherein when the first transmitter electrode receives a first driver signal, the first receiver electrode senses the first driver signal from the first transmitter electrode to generate a first touch signal while the second receiver electrode also senses the first driver signal from the first transmitter electrode to generate a second touch signal, and wherein when the second transmitter electrode receives a second driver signal different from the first driver signal, the second receiver electrode senses the second driver signal from the second transmitter electrode to generate a third touch signal while the third receiver electrode also senses the second driver signal from the second transmitter to generate a fourth touch signal, wherein the same second receiver electrode senses the first driver signal from the first transmitter electrode and the second driver signal from the second transmitter electrode.

* * * * *